April 17, 1956  H. A. SMITH ET AL  2,742,230
VALVES FOR CONTROLLING THE FLOW OF FLUIDS
Filed Oct. 20, 1951  7 Sheets-Sheet 1
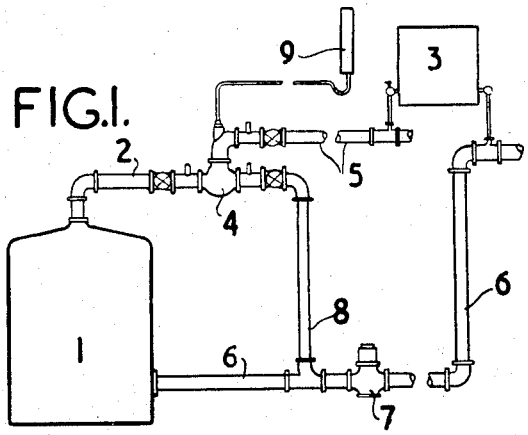
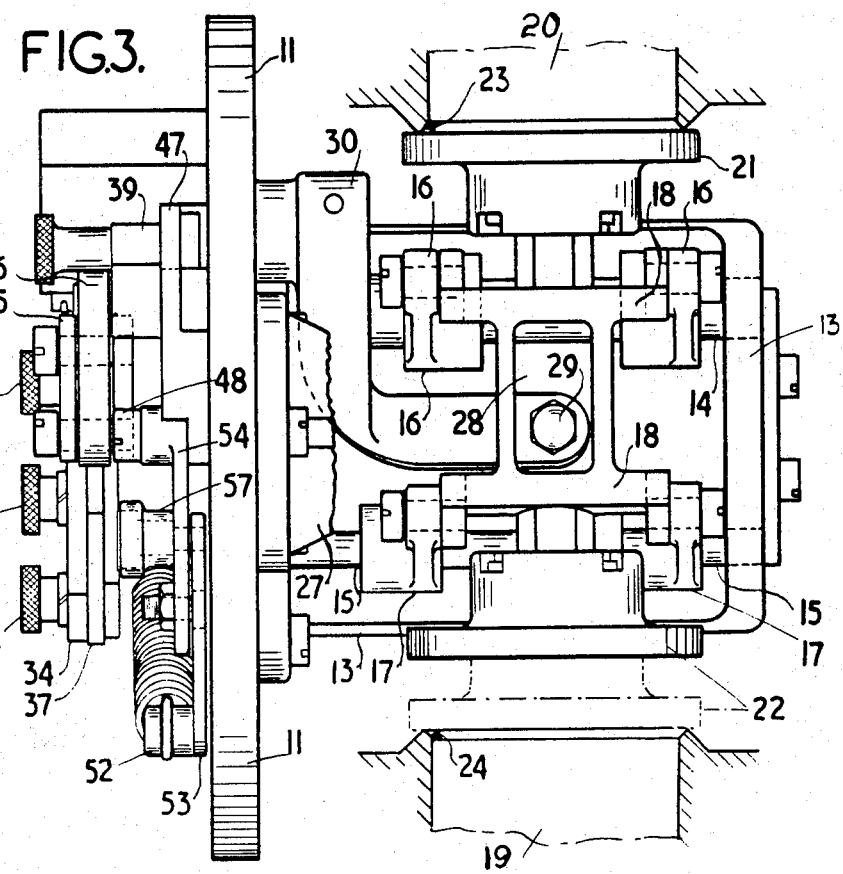
INVENTORS
HERBERT ALWYN SMITH
GEORGE FREDERICK HERRERA-LOTT
By E. J. Freeman
ATTORNEY

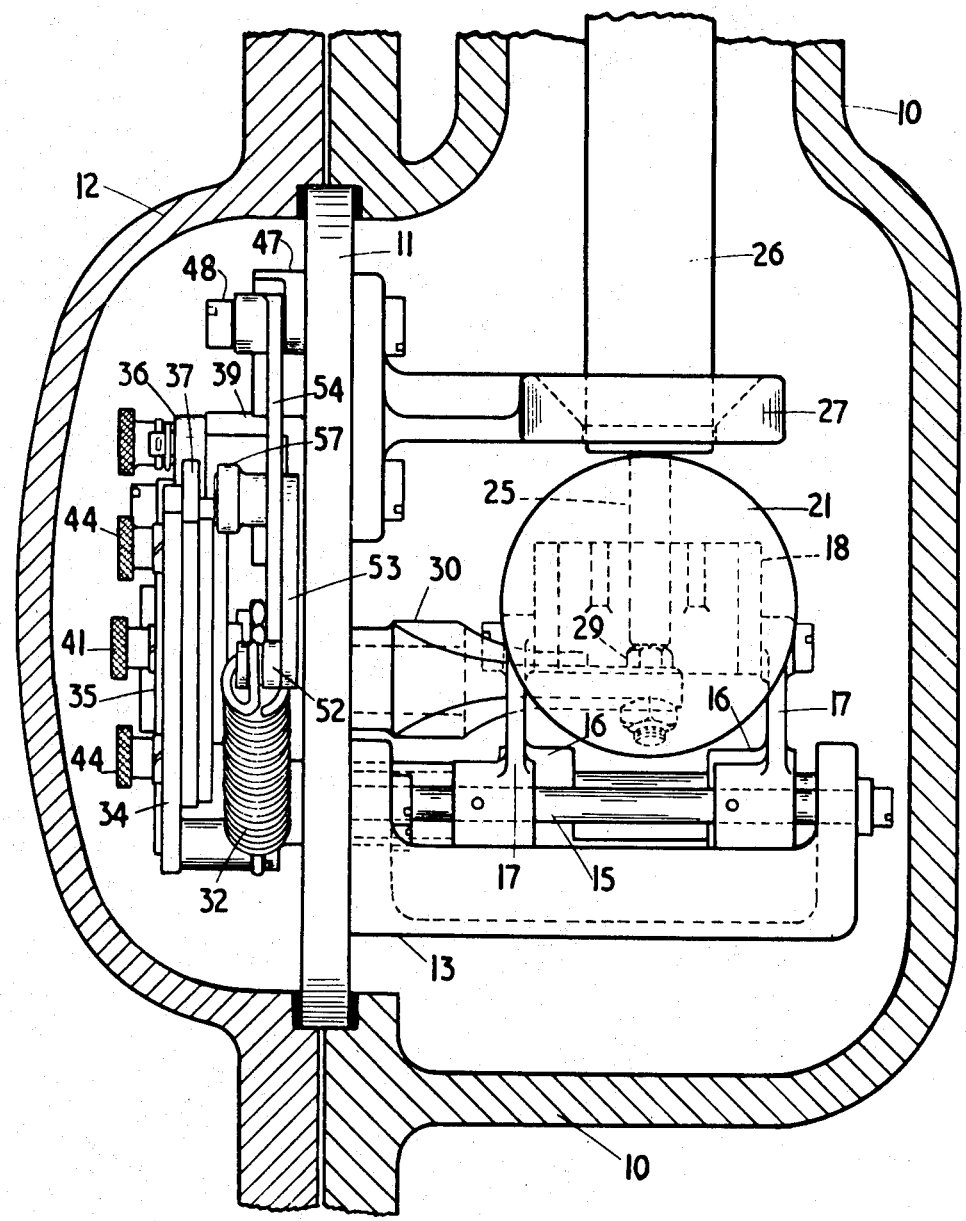

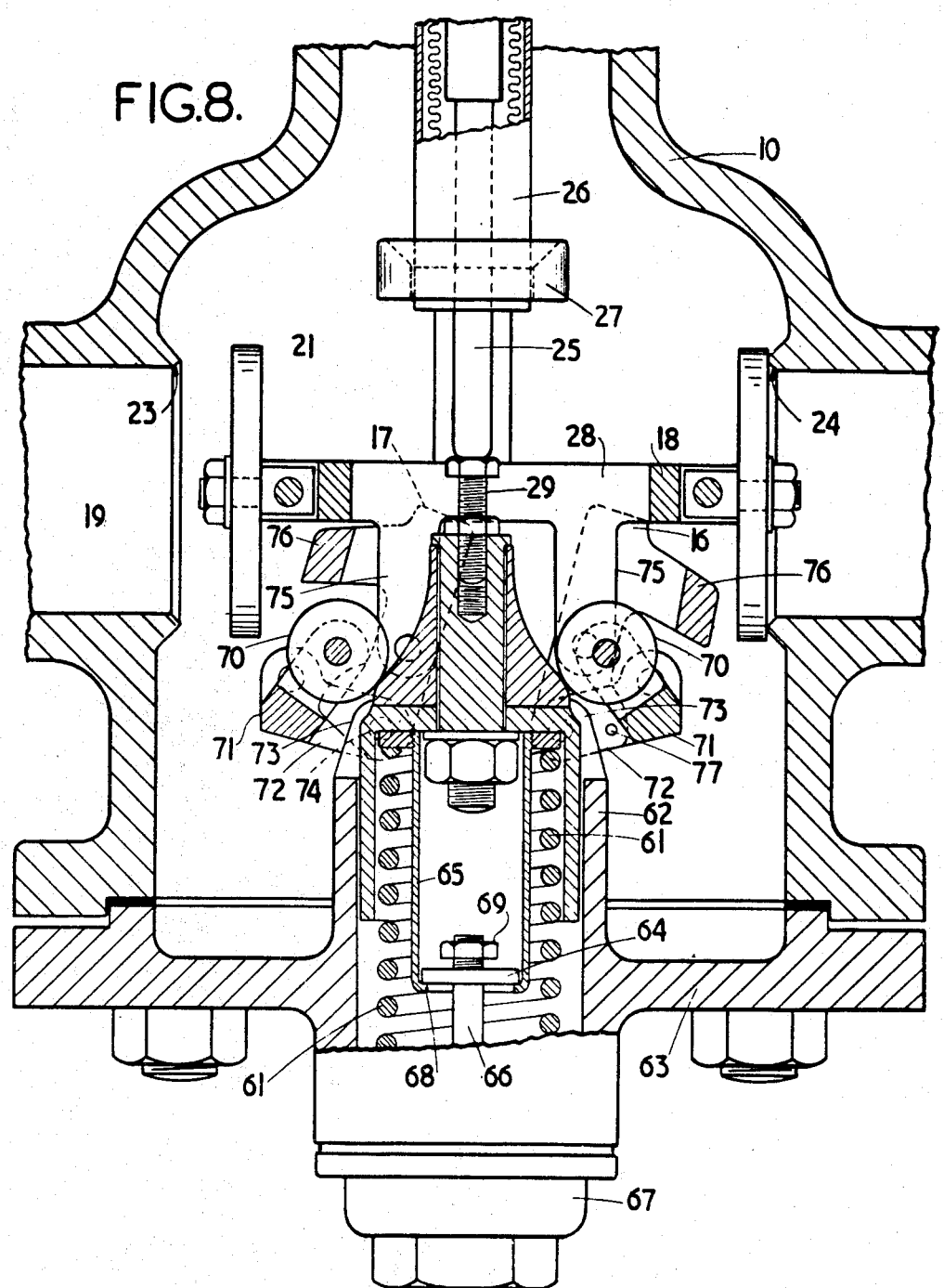

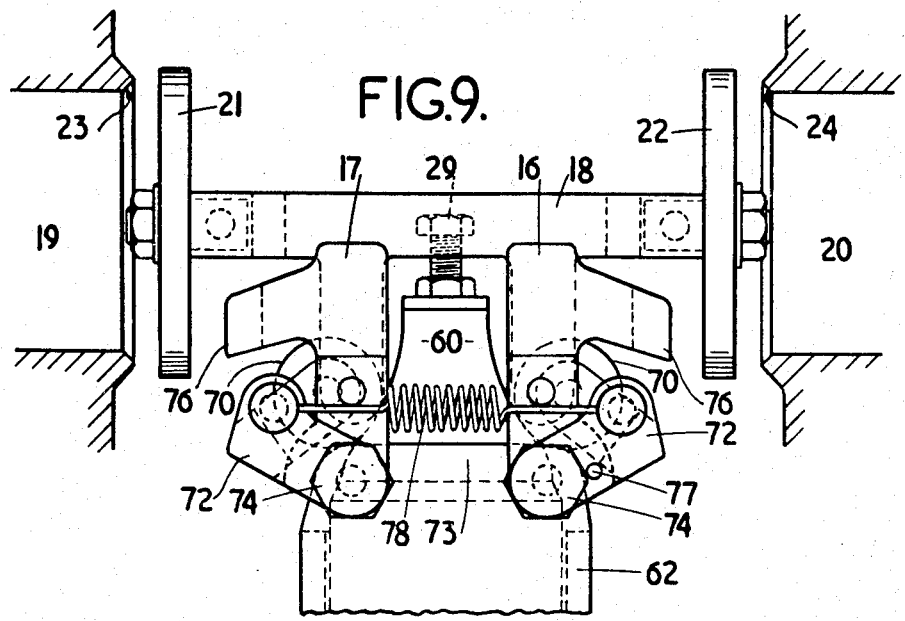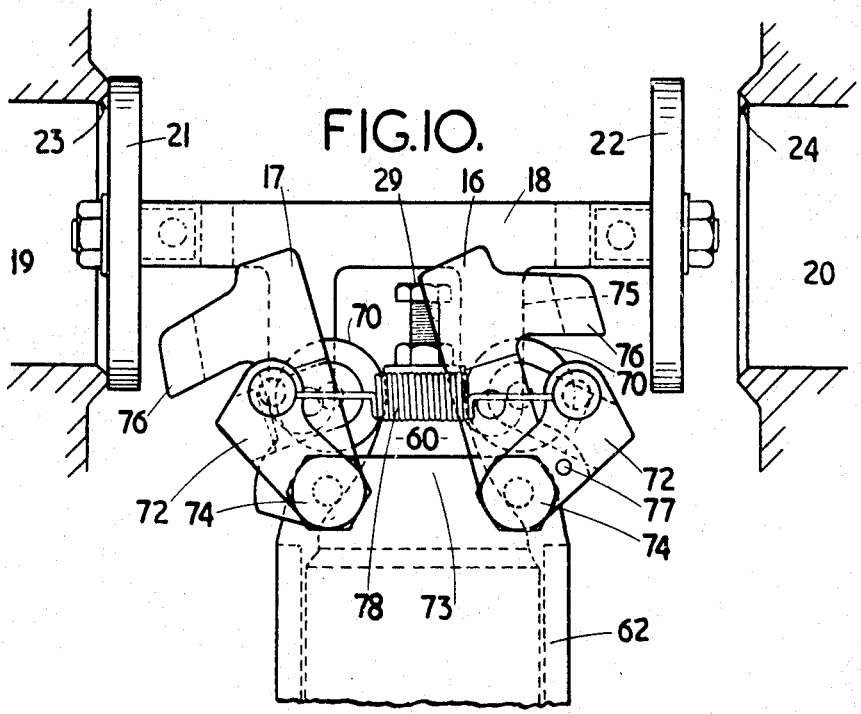

tent Office 2,742,230
Patented Apr. 17, 1956

2,742,230

VALVES FOR CONTROLLING THE FLOW OF FLUIDS

Herbert Alwyn Smith and George Frederick Herrera-Low, Cheltenham, England, assignors to Spirax-Sarco Limited, Cheltenham, England Application October 20, 1951, Serial No. 252,293

11 Claims. (Cl. 236—12)

This invention has reference to thermostatic valves (that is, valves of the kind wherein a movable member is actuated by a temperature sensitive device which may comprise one or more thermostatically actuated units) for controlling automatically the proportions in which streams of relatively hot and cold liquids are mixed so as to provide a mixture of a desired temperature. For example, valves of this kind may be utilised for controlling the temperature of a liquid circulating through the central heating system of a building, the cooling system of a stationary internal combustion or diesel engine or any other similar system for heating or cooling an enclosed space, in an attempt to maintain the temperature of the said space at, or in the vicinity of, a predetermined constant value.

Before any approximation to a constant temperature can be obtained, in such a heated or cooled space, several variable factors have to be taken into consideration and compensated. One of the variable factors which is difficult to compensate, is the effect of variation in the atmospheric or ambient temperature externally of the space; this difficulty arises because variation in the difference between the internal space and external ambient temperature alters the rate at which heat is lost through the walls enclosing the space and because, for any given difference between the said temperatures, the heat losses through different types of wall are not the same.

In an attempt to maintain a constant space or room temperature in a building, it is known to actuate a thermostatic valve by a heat sensitive device of which one unit is accommodated in, and is subjected to the temperature within, the said space or room. However, such an arrangement is not entirely satisfactory and does not prevent temperature variations within the said space because after each drop in the external ambient temperature, there is a time lag before the said unit is affected by the said temperature drop and a further time lag before the consequent hotter liquid mixture supplied to the heating system reaches the radiators or like heating apparatus in the space to compensate the greater heat losses through the walls of the building; consequently there is a period during which the space temperature falls below the predetermined constant. Similarly, an increase in the external ambient temperature results in a period during which the space temperature exceeds the said constant.

In an endeavor to overcome this disadvantage, it has been proposed to locate the unit of the heat sensitive device in a position where it is exposed or subjected to the external ambient temperature. However, this proposal gives rise to a further difficulty because the rate of heat losses through the walls enclosing the space, for any given difference between space and external temperatures, is rarely the same for two different buildings. As a consequence, the valve to be installed in each heating system has had to be designed to satisfy the particular requirements of that system; or, alternatively, a range of standard valves have been made available and one of the range which is adapted to satisfy the particular requirements most closely, has been installed.

Furthermore, it is believed that all known thermostatic valves provided for the purpose of controlling the temperatures of a heating or cooling system, have been capable of varying the proportions of the hot and cold streams, only in a manner which, when plotted against temperature variations, gives a straight line. Therefore, even when a specially designed valve, actuated by an external heat sensitive device, is installed, the controlled space temperature is only approximately constant because the heat losses through any space enclosing wall give, when plotted against varying differences between internal and external temperatures, a logarithmic curve which obeys some special exponential but readily ascertainable law.

The term "exponential law" used herein is to be understood as meaning a law in which the heat loss is related to a selectable constant exponent power of the above-mentioned difference between space and external temperatures, the selection of the said constant exponent power being determined by the needs of a particular building or enclosed space.

The principal object of the invention is to provide a thermostatic valve which is adapted to mix streams of hot and cold liquid in proportions which enable the above difficulties to be overcome substantially in their entirety.

A further object of the present invention is to provide a new or improved construction of thermostatic valve whereby hot and cold streams of liquid may be mixed so that the controlled temperature of a space or room to be heated or cooled by the mixture may approximate closely to a predetermined constant.

In accordance with the said invention, a thermostatically controlled valve for blending two fluid streams of differing temperatures to provide a mixture suitable for feeding to heat exchange apparatus in an enclosed space so as to maintain the said space substantially at a preselected constant temperature, comprises an oscillatory carriage, having a valve closure member at each of two opposed ends thereof, which is housed within the valve casing intermediate seats around ports in the casing through which the said streams pass, the carriage being displaceable under the control of a heat sensitive device influenced by the ambient temperature of the space and comprising a drive transmitting member which is moved in linear relationship to variations in ambient temperature and which actuates the carriage through intervening mechanism adapted to convert the said linear movements into carriage movements whereby the proportion of one of the said fluid streams relatively to the total mixture is varied in accordance with an exponential law so that the total heat input to the space is equated with the total heat losses from the space over a range of ambient temperatures.

Preferably the carriage-actuating mechanism comprises a system of parallel levers which supports and imparts movement to the carriage, and lever-operating means which includes the member controlled by the heat sensitive device and converts the movement of the said member into the desired carriage displacement whereby the relative proportions of the liquid streams are constrained to obey the given exponential law.

If desired, the lever-operating means may be adjustable so that the carriage displacement may be varied in relation to the movement of the member controlled by the heat sensitive device and the relative proportions of the fluid streams that are to be mixed may be varied in accordance with any one of a range of different exponential laws.

In order that this invention may be more readily understood and carried into practice, reference will now be made to the accompanying drawings, wherein:

Figure 1 illustrates, diagrammatically, a typical central heating plant of a building.

Figure 2 is an elevation, partly in section, of a valve which is suitable, inter alia, for use in the system shown in Figure 1.

Figure 3 is a plan of the valve mechanism shown in Figure 2.

Figure 8 is a sectional elevation of an alternative or modified valve construction.

Figure 9 is an elevation of part of the valve mechanism shown in Figure 8, the said mechanism being in a different operational position.

Figure 10 is a sectional elevation of the mechanism shown in Figure 9 in still another operational position.

Figure 4:
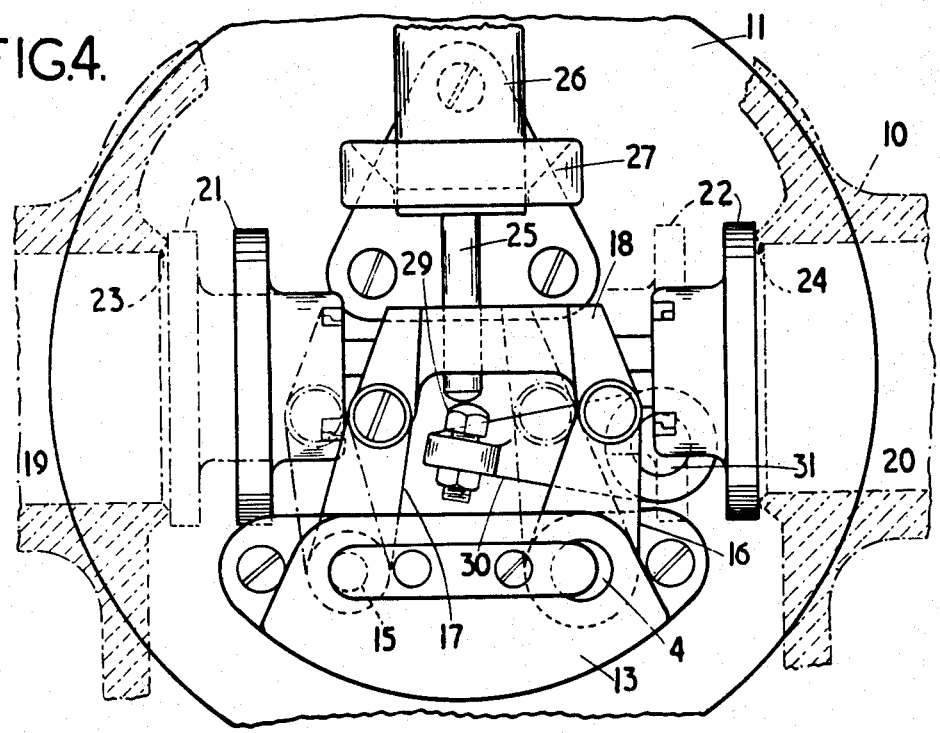
Figure 4 is an elevation of the valve mechanism, looking from the right hand side of Figure 2.
Figure 5:
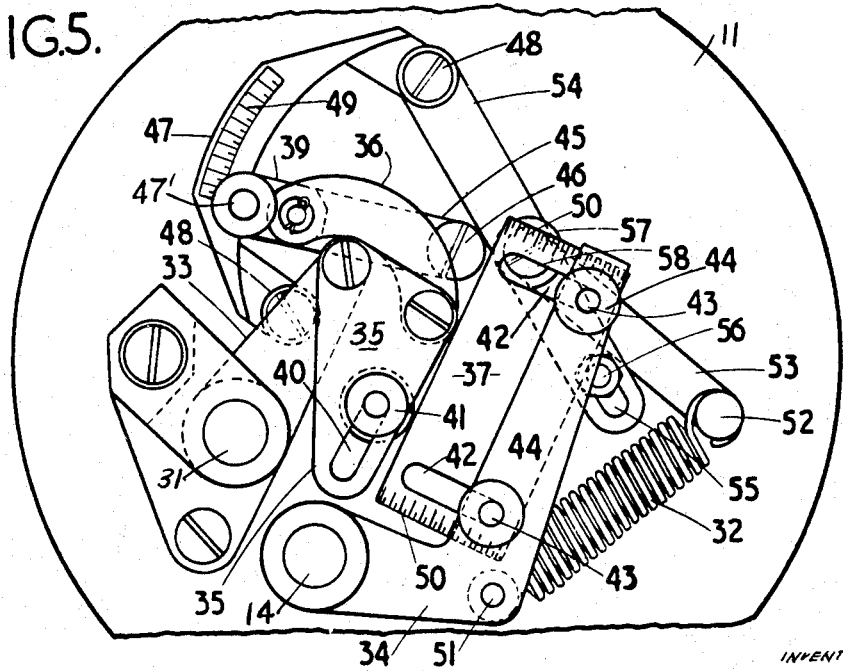
Figure 5 is an elevation of the valve mechanism, looking from the left hand side of Figure 2.

The central heating system shown in Figure 1 comprises a boiler or calorifier 1 for heating water to be circulated through the said systems; preferably the boiler or calorifier is of a known type which heats the water fed therefrom through a pipe 2 to a number of radiators (of which one is indicated at 3), to a constant temperature. The hot primary flow water is fed from the boiler to the said radiators through a valve 4, to one inlet of which the pipe 2 is connected, and a pipe 5 which is connected to the outlet of the valve.

Cool water is returned from the radiators to the boiler or calorifier 1 through a pipe 6 in which a circulating pump 7 is installed. Part of the cool water by-passes the said boiler or calorifier, through a pipe 8 which is connected to a second inlet of the valve 4 wherein it is mixed with the hot primary flow water supplied through the pipe 2. The mechanism of the valve 4 is controlled (in a known manner) partly by a thermostat 9 which is located outside the building of which the interior is to be heated by the radiators 3, and partly by a thermostat 26 which is housed within the valve 4 and is under the influence of the mixed hot and cool streams of water entering the valve through the pipes 2 and 8; the control of the valve mechanism by the thermostats is such that the mixture supplied to the radiators through the pipe 5 is at a predetermined temperature which varies when the atmospheric temperature (that is, the external ambient temperature of the building) varies, since the thermostat 9 is under the influence of the said external ambient temperature.

The thermostat 9 serves as a heat sensitive device which operates the valve mechanism in a manner such that any variation in external or ambient temperature causes the said device to impart a movement to the said mechanism whereby the relative proportions of the streams of water entering the valve from the pipes 2 and 8, are varied with the result that the temperature of the mixture flowing to the radiators through the pipe 5 is either increased or decreased. This increase or decrease in mixture temperature takes place simultaneously, or substantially simultaneously, with the variations in the ambient temperature; consequently, by the time the room or space temperature of the building is affected by the said variations, the effect is compensated by the dissipation of more or less heat into the room or space by the radiators. Obviously it is only the external thermostat 9 which actuates the valve mechanism in response to variations in the ambient temperature, the other or internal thermostat 26 being provided merely for the purpose of compensating any departure from predetermined or design value of the temperature of the cool water returned to the valve from the radiators or of the primary hot water supplied to the valve from the calorifier; that is to say, the thermostat 26 is provided to compensate (so far as possible) for any variation from designed conditions of the primary flow and return flow temperatures; for example, the return flow temperature may depart from the design or expected temperature because of unfair usage of the heat exchange apparatus caused by excessive draughts over the apparatus or by the temporary presence in the space of some additional source of heat; or again, the temperature of the primary flow of hot water from the calorifier may fall temporarily because the water is tapped off for some other purpose, thereby temporarily reducing the primary flow temperature. The thermostat 26 in the mixture merely compensates for such temporary and unforseeable departures and the carriage movements initiated thereby are superimposed on the movements initiated by the other and main thermostat 9 which is influenced by variations in the ambient temperature. In other words, the valve mechanism is designed for average conditions which might be expected in, say, a building which is heated by radiators obtaining the hot primary flow from a calorifier intended to maintain the said flow at a constant temperature; if these basic factors are altered temporarily for any reason, then the average or designed conditions no longer exist and the departure from average is compensated solely by the thermostat 26 which is under the influence of the mixture temperature.

Instead of arranging the valve as shown in Figure 1, so that the relatively hot and cold streams of water are mixed therein before being supplied to the radiators, the valve may be arranged at the junction of the return and by-pass pipes 6 and 8; in such circumstances all the cool water returning from the radiators is fed to the valve interior and this water is divided, in proportions determined by the position of the valve mechanism under the control of the heat sensitive device, into two separate streams which are discharged from the valve into the pipes 6 and 8 respectively; the stream discharged into the pipe 6 is re-heated in the boiler or calorifier 1 and, after flowing along the pipe 2, is mixed with the water discharged to the pipe 8; the mixture then flows through the pipe 5 to the radiators 3. Such an arrangement is rarely used in heating systems as exemplified by Figure 1, but is used more frequently in cooling systems, for example, the cooling systems of stationary internal combustion or diesel engines, in which the return water is relatively hot and is divided into two streams of which one is fed to and through a cooler before being re-mixed with the other stream and returned to the cooling jacket of the engine.

Figures 2–12 of the above-mentioned drawings show two alternative mechanisms which may be provided in the valve 4 so that the proportion of primary hot water supplied to the valve relatively to the total mixture varies in accordance with an exponential law instead of in a proportion which varies directly or linearly with variations in the external ambient temperature as is done by known valve mechanisms.

The valve mechanism shown in Figures 2–7 is carried, internally of the casing 10 of the valve 4, upon a plate 11 which is secured, in a liquidtight manner, in an opening in one wall of the casing by a detachable domed cover 12. Thus, the plate separates the interior of the casing from the interior of the cover and prevents any water which flows through the casing from gaining access to the interior of the cover, around the edge of the plate.

A rigid bracket 13 is secured to, and projects at right angles from, the plate face adjacent the interior of the casing and two spaced and parallel spindles 14, 15, are journalled in the said bracket. Two pairs of parallel levers 16, 17, of which the pair 16 is fixed upon the spindle 14 and the other is fixed to the spindle 15, have a carriage 18 pivotally connected to their free ends.

The carriage is located intermediate two co-axial ports 19 and 20 formed in the wall of the casing 10 (see Figures 3 and 4); in the central heating system illustrated in Figure 1, the pipe 2 is connected to the valve 4 so as to supply hot primary flow of water to the interior of the casing through the port 19, and the by-pass pipe 8 is connected so as to supply cool return water to the interior of the casing through the port 20. Discs 21 and 22 are assembled to the carriage ends adjacent the ports 19 and 20 respectively, the assembly being effected by joints which permit the said discs to make a limited universal movement relatively to the carriage.

The carriage is adapted to be oscillated by the levers 16, 17, from one extreme position (indicated in full lines in Figures 3 and 4) wherein the disc 22 abuts an annular seat 24 around the port 20, thereby closing the said port and leaving the port 19 fully open, to an alternative extreme position (indicated in dotted lines in Figure 4) wherein the disc 21 abuts a similar seat 23 around the port 19, thereby closing port 19 and opening the port 20. In intermediate positions of the carriage, both ports are partly open so that water entering the casing therethrough is mixed internally of the casing in proportions depending upon the distance of the discs from their respective ports.

The thermostat 9 (Figure 1) forms one unit of a heat sensitive device of which another unit 26 is housed within the casing 10 where it is located by engagement with an eye-piece 27 fixed to the plate 11 on the opposite side of the carriage 18 to the bracket 13. A plunger 25 projects from the unit 26 into and through an opening 28 in the said carriage; any drop in the external ambient temperature of the building heated by the system of Figure 1, or in the water in the casing 10, withdraws the plunger inwardly of the unit 26, whereas any increase in either of the said temperatures expels the plunger further from the unit, the plunger movement being in direct proportion and having a linear relationship to any such temperature variation. Similarly, any variation in mixture temperature due to the departure from design temperature of the water entering the casing through either of the ports 19, 20, displaces the said plunger.

The nose of the plunger abuts the head of a bolt 29 which is carried by and is longitudinally adjustable in a lever 30 keyed to a drive-transmitting shaft 31 journalled in and extending through the plate 11; the shaft is included in a lever-operating mechanism and is subjected to the action of a spring 32 whereby the head of bolt 29 is maintained in abutment with the nose of the plunger; hence, the location of the carriage is under the control of the heat sensitive device and of the spring.

The lever-operating mechanism converts the plunger movements into carriage movements which result in the streams of water flowing through the ports 19 and 20 being mixed in proportions which, unlike the plunger movements, are not in linear relationship to variations in the external ambient temperature but vary in accordance with a given exponential law; for any particular building being heated by a central heating system in which the valve is installed, the said law may be calculated by a heating engineer and is dependent partly upon the rate at which heat is lost through the walls of the building and partly upon the rate at which heat is dissipated into the building by the radiators of the system at specified ambient and room or space temperatures and at specified temperatures at which the primary hot water and return water are supplied to the valve.

The displacements necessary for satisfying these requirements are imparted to the carriage 18 from the plunger 25, by securing a lever 33 to that end of the drive-transmitting shaft 31 which is located on the opposite side of the plate 11 to the carriage; by extending the spindle 14 through the plate and securing a bellcrank lever 34 to the spindle end within the cover 12; and by interposing between the lever 33 and the bellcrank lever 34, a swingable triangular link 35, by which drive is transmitted between the levers 33 and 34 and the swinging movement of which is controlled by an arcuate ling 36 so that it has a cam action. The spring 32 acts on the bell-crank lever and drives the said lever towards the triangular link, thereby loading the said link and the levers 30, 33, to retain the bolt 29 in contact with the plunger 25.

The edge of the bell-crank lever which is presented to the triangular link, is straight. The lever makes no actual contact with the triangular link, the drive between the lever and link being effected through a rectangular plate 37 which is mounted on the lever and contacts a roller 38 mounted on the link; the roller-contacting edge of the plate is parallel to the straight edge of the bellcrank lever, the plate being adjustable relatively to the lever and the roller being adjustable relatively to the link.

The link 35 is in the form of a right-angled triangle, the corner which comprises the right angle being pivotally connected to the one end of the arcuate link, the other end of which link is pivoted to a support 39 located at the opposite side of the lever 33 to the triangular link. A second corner of the triangular link is pivotally connected to the said lever 33, whereas the third corner is formed with a slot 40, the longer center line of which is parallel to the link edge adjacent the plate 37, and in which the spindle of the roller 38 is clamped by a milled nut 41. The rectangular plate is formed with slots 42 of which the longer center lines are at right angles to the straight edge of the bell-crank lever and which are engaged by bolts 43 extending through the lever and being provided with milled clamping nuts 44 whereby the plate is secured relatively to the said lever.

The link support 39 is integral with the free end of an auxiliary lever 45 of which the other end is journalled about a bolt 46 fixed to the plate 11 on the same side of the lever 33 as the triangular link; the said support is provided in one side thereof with a jaw which engages an arcuate bar 47 which is fixed in spaced relationship to the plate 11 by bolts 48, which support is clamped to the bar by a bolt 47' extending into the said jaw.

The upper face of the bar 47 is provided with a system of graduations 49 and corresponding graduations 50 are provided on each lateral edge of the rectangular plate 37. When setting the mechanism ready for use, the support 39 is positioned so that a datum mark thereon is in register with a predetermined graduation on the bar 47 and the rectangular plate is positioned so that the corresponding graduations on its edges register with the straight edge of the bell-crank lever; finally, the roller 38 is adjusted lengthwise of the slot 40 so that its periphery contacts the adjacent edge of the said rectangular plate, when the triangular plate 35 is in the position shown in Figure 7, with the axis of the roller-constraining slot substantially at right angles to the graduated edges of the said rectangular plate.

The spring 32 extends between and is anchored to studs 51 and 52, the stud 51 being fixed to the elbow of the bell-crank lever and the stud 52 being fixed to the free end of one arm 53 of a Y-shaped lever; the Y-shaped lever consists of a bar 54 having one end pivotally secured to end of the arcuate graduated bar which is further from the drive-transmitting shaft 31, the other end of the arm 53 pivoted thereto intermediate its ends, and a slot 55 in its free end. The bar 54 is spring-driven into abutment with the bolt 56 until displaced by the link 35. A bolt 56 is clamped in the slot 55 and a roller 57 is disposed around a stud 58 whereby the arm 53 is assembled to the bar 54; the head of the bolt 56 is located in the plane of the arm 53 and the latter is retained in abutment with the said head by the action of the spring 32; the roller 57 is located in the path of travel of the triangular link and is forced by the said link in the direction which expands the spring 32, as the said link approaches the position shown in Figure 7 so that the roller 57 assists in initiating the return travel of the said link.

Suppose that:
1. The boiler or calorifier 1 supplies water to the valve 4 at a temperature of 180° F. so that, at full loads (that is, when the carriage is positioned so that the port 19 is fully open and the port 20 is closed) the whole of the water circulating in the system is returned to the boiler and is fed to the heating system at the maximum flow temperature of 180° F.
2. The desired room temperature is 65° F.
3. The system is designed to maintain the desired room temperature at a minimum external ambient temperature of 27.5° F.
4. When the valve is operating at maximum load, the water is returned from the system at a temperature of 160° F.
5. The heat transfer exponent from the water in the system to the room or space through the walls of the radiator, and the heat transfer exponent from the room or space to the external atmosphere through the walls of the building are equal and are of a value of 1.3. Then, by calculation, it can be ascertained that at an external ambient temperature of 35° F., which represents a travel of 20% of maximum by the plunger 25, the primary flow water to be supplied to the valve is 39% of the total flow of water through the system. The spring 32 tends to hold the carriage in full load position wherein the primary flow is 100% of the total. Consequently, to provide a primary flow of 39% the carriage must be displaced through 61% of its full stroke towards the port 20.

The bar 47 and each edge of the rectangular plate 37 is provided with ten equally spaced graduations representing valve settings in which a 20% travel of the plunger gives carriage displacements of different predetermined values. In one typical valve mechanism, the graduations represented, from zero upwards, the following percentage displacements of the carriage, namely 76.2, 73.8, 71.4, 68.9, 66.1, 64, 61.4, 58.7, 56.3, 53.9 and 51.5.

Therefore, if the heating system called for a primary flow of 39% of the total flow for the initial 20% travel of the plunger, the support 39 would be set with the datum mark between the sixth and seventh graduations from the lower end (Figure 5) of the arcuate bar 47, and the rectangular plate 37 would be positioned so that points located between the corresponding sixth and seventh graduations from the righthand edge (Figure 5) of the said plate, register with the straight edge of the bell-crank lever 34.

From the above figures it will be appreciated that the arrangement of the triangular link 35 and arcuate link 36, is such that during the initial travel of the plunger 25 from its initial position, namely, its position when the valve is operating at full load, a relatively large displacement is imparted to the carriage, and that this relative displacement can be varied within wide limits so that the valve mechanism is adjustable to enable the relative proportions of the hot and cold water to be varied in accordance with a correspondingly wide range of different exponential laws.

Figure 6:
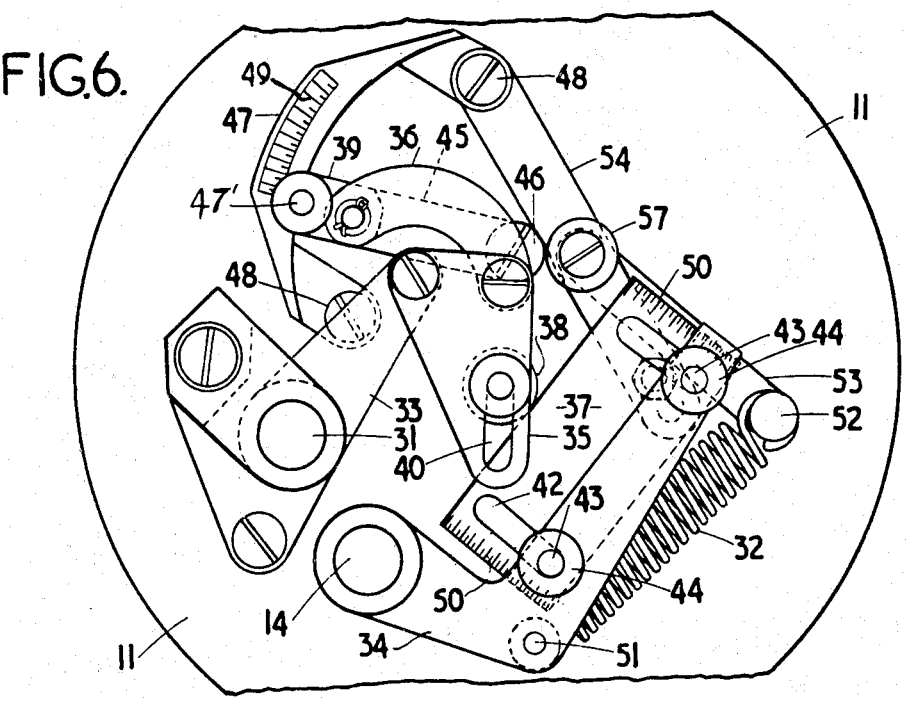
Figures 6 and 7 are similar views to Figure 5, showing the valve mechanism in two different operational positions.
Figure 7:
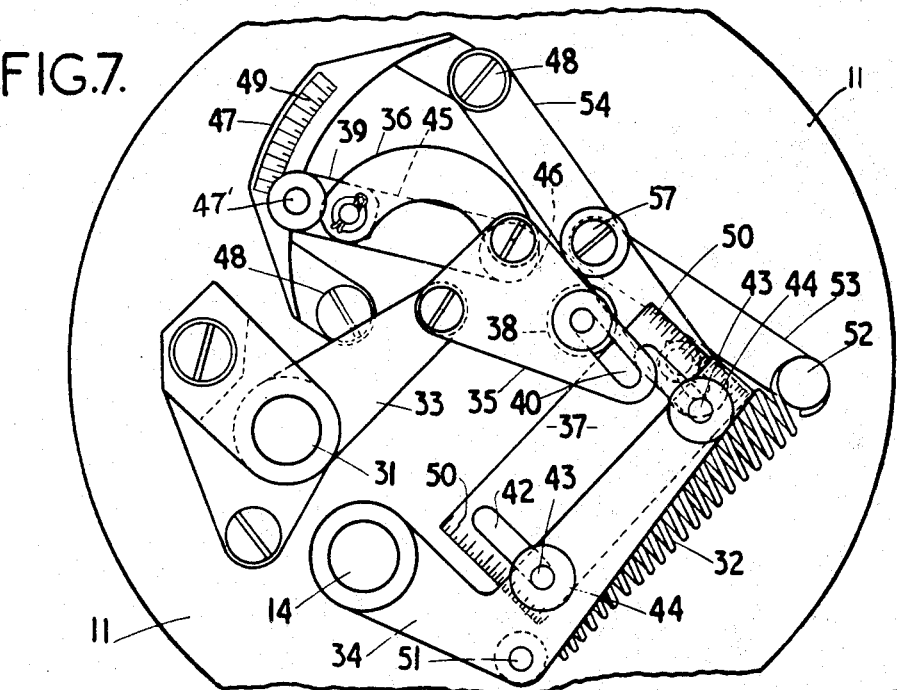
Figure 11:
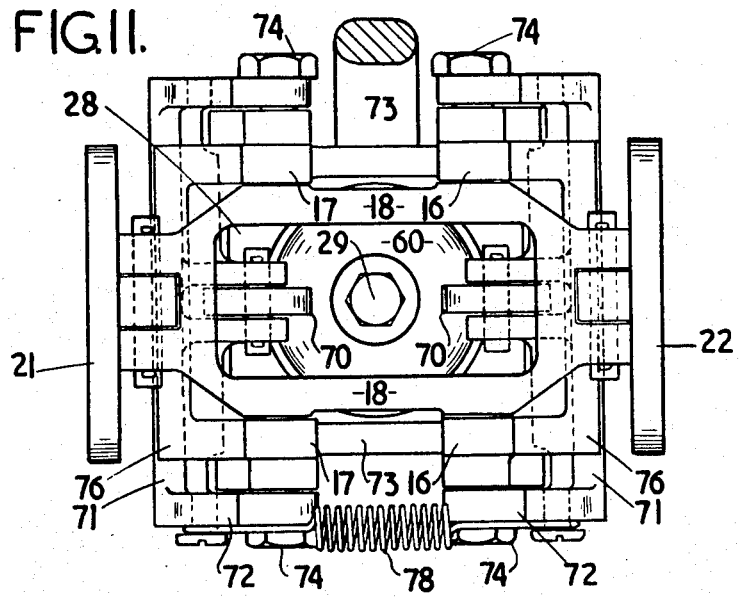
Figure 11 is a plan of the valve mechanism as shown in Figure 9.
Figure 12:
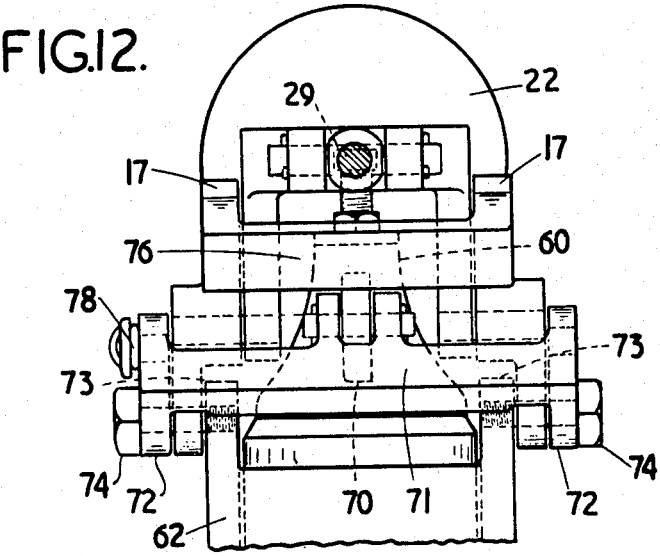
Figure 12 is an elevation, partly in section, looking from the right hand side of Figure 9.

In Figures 2–5 the valve mechanism is shown in its maximum load position, with the support 39 and rectangular plate 37 at their zero settings so that, in operation, the triangular link 35 imparts the maximum displacement to the carriage 18 for the initial 20% travel of the plunger 25. In Figures 6 and 7, the mechanism is shown in two intermediate load positions, the plunger having travelled through successively greater portions of its maximum stroke.

Any axial movement of the plunger 25 (which movement bears a linear relationship to variations in ambient temperature provided that the temperatures of the cool return water and of the primary hot water do not depart from their design value) results in a corresponding rotary movement of the shaft 31, and a corresponding angular movement of the lever 33; the movement of the lever 33 actuates the triangular link 35 and roller 38 so that the assembly of lever 34 and plate 37 is either driven against the action of the spring 32 or is enabled to make a spring-driven return movement. When the triangular link is actuated, the roller 38 moves along a curved path since the link is caused to swing about its connection to the lever 33 which is displaced along the arc of a circle having its centre at the axis of the shaft 31. Consequently, supposing that, in travelling from its position shown in Figure 5 towards its position shown in Figure 7, the lever 33 moved in a succession of steps of equiangular dimensions, then for each successive step, the angular movement imparted to the bell crank lever 34 would gradually diminish, as also would the lateral movement imparted to the carriage 18. For this reason alone, the relative proportions of the hot primary and cool return water in the mixture would not vary in linear relationship to the ambient temperature variations.

However, the path of travel of the roller 38 is not a true arc of a circle because the right-angled corner thereof, which is tied to the static support 39 by the arcuate link 36, swings about its connection to the said link and this connection is also displaced along a path which is a true arc of a circle and has its centre at the said connection to the stationary support.

Thus the path of travel of the roller 38, the angular movement of the bell-crank lever 34 and the lateral travel of the carriage 18 are determined by the arcuate displacements of the connections of the triangular link to the lever 33 and link 36 which displacements ensure that the carriage travel is such that the proportions of the hot primary water flow does not bear a linear relationship to the mixture flow as the ambient space temperature rises or falls.

As the triangular link approaches the limit of its angular movement against the action of the spring 32 and by plunger travel outwardly of the unit 26, it comes into contact with the roller 57 of the Y-shaped lever 53-54. Thereafter, continued angular movement of the said link swings the said lever about its fulcrum thereby driving the stem of the lever away from the bolt 46 (which serves as a stop for limiting the spring-driven lever movement) and the stud 52 away from the stud 51. At this stage the rate of angular movement of the bell-crank lever relatively to that of the triangular link is small but the movement imparted to the stud 52 causes the tension of the spring 32 to be increased at approximately the same rate as during the initial and relatively rapid angular movement of the bellcrank lever.

The increased tension imparted to the spring by such separation of the studs 51 and 52 offers no material resistance to the travel of the triangular link because this travel is initiated by the plunger 25 which is driven outwardly of the thermostat by the expansion of a liquid in the thermostat 9 due to an increase in ambient temperature and the force exerted by such expansion is greatly in excess of any resisting force which the spring 32 is capable of exerting on the triangular link through the lever 54.

It will be observed from Figure 7 that when the valve is operating under no-load conditions, that is when the valve disc 21 is in the dotted line position shown in Figure 3, the triangular link has assumed a position wherein the line passing through the centres of the roller 38 and the pivoted connection between the links 38 and 36, is substantially at right angles to the edges of the bell crank lever 34 and the plate 37 secured to the latter. Hence, if return movement of the triangular link was initiated only by the action of the spring 32 on the said bell-crank lever, the latter would be unable to effect the return movement of roller 38, link 35, link 33, shaft 31 and lever 30 so that, any reduction in ambient temperature would merely result in the plunger 25 receding from the bolt 29; however, such conditions are prevented by the spring-driven return movement of the bar 54 towards and onto the stop 46 which, acting through the roller 57 swings the said link to such a position relatively to the roller-connected edge of the plate 37, that further return movement of the link may be initiated by the spring loaded bell crank lever.

The construction and arrangement of the cam mechanism shown in Figs. 2–7, has been so designed that any axial displacement of the plunger 25 results in a movement of the carriage 18 which follows the exponential law applicable to a given heating or cooling system, and that, by simultaneous adjustment of the lever 45 and plate 37 to corresponding graduations of the scales 29 and 50, the carriage movement may be varied to follow the same law but having different heat transfer components.

The alternative or modified valve mechanism shown in Figures 8–12 has the advantage that it is less complicated and less expensive to manufacture than the mechanism of Figures 2–7.

The said alternative or modified mechanism comprises a port-controlling and mixture proportioning carriage 18 which is provided with discs 21 and 22 for closing the ports 19 and 20 in the no-load and maximum load positions, respectively, of the mechanism.

The plunger 25 of the unit 26 of the heat sensitive device abuts an adjustable bolt 29 carried in the end of a cam 60 which is driven plunger-wards by a coiled compression spring 61 housed in a chamber 62 of a detachable cover 63 secured to the casing 10. The spring-driven travel of the cam is limited by a disc 64 which is located within an open-ended cylindrical extension 65 from the base of the cam, the said disc being carried upon a rod 66 integral with or secured to a cap 67 removably engaged in the outer end of the chamber 62, and being disposed between an internal lip 68 around the mouth of the cylindrical extension, and a nut 69 on the rod end located internally of the said extension.

The cam is located between two rollers 70, each of which is rotatably mounted at the centre of a U-shaped bridge 71 and makes peripheral contact with the cam surface, thereby serving as a carriage-actuating projection. The sides 72 of each bridge are pivotally connected by studs 74 to ears 73 projecting from the inner end of the chamber 62. Two pairs of parallel levers 16, 17, are also pivotally connected to the ears 73 by the same studs; arms 75 integral with the carriage, extend towards the chamber 62 and each arm is pivotally connected to a corresponding lever 16 or 17, intermediate the ends of the said levers; at their ends remote from the studs 74, the levers of each pair are interconnected by an integral tie 76. The levers 17 are angularly displaceable relatively to the corresponding bridge, whereas the levers 16 are fixed to the corresponding bridge by pins 77; consequently, drive is transmitted from the cam to the carriage only through the pair of parallel levers 16 and the corresponding bridge 71 and roller 70. A tension spring 78 extends between and is connected to the two bridges and retains both the rollers 70 in resilient contact with the cam; the roller corresponding to the levers 17 merely balances the spring pressure exerted on the cam.

To enable the travel of the plunger 25 to be converted into carriage movement by the cam, when transmitted to the carriage through the said cam, the levers 16 and the corresponding roller 70 and bridge 71, in the same manner as the said plunger movement is converted by the links 35 and 36 of the mechanism shown in Figures 2–7, the said cam is given an external configuration which follows a pre-calculated design whereby, during the initial travel of the plunger, the carriage is given a relatively large displacement from the maximum load position shown in Figure 8. Figure 9 shows the carriage centralised between the ports 19 and 20 so that the streams of water flowing through the said ports are mixed in equal proportions and Figure 10 shows the carriage in its no-load position wherein the primary flow port 19 is closed.

The mechanism shown in Figures 8–12 cannot be adjusted so as to enable the carriage displacement, which is under the control of the plunger and the springs, to be varied so that the said streams of water are mixed in proportions which are in accordance with a different exponential law; however, this may be done by replacing the existing cam 60 by a cam having a different pre-calculated configuration, which exchange is adapted to be effected quickly and easily merely by removing the cap 67 from the chamber 62.

Being given the temperature to which the primary flow is heated, the temperature of the return water when the valve mechanism is in its maximum load position, the desired room or space temperature, the maximum external ambient temperature at which the said room or space temperature can be maintained, the heat transfer exponents of the radiator or like heat dissipating appliances and of the walls of the building, it is possible to calculate the axial and transverse co-ordinates of the various locations of the centres of the rollers 70 relatively to the axis of the cam for the various positions of the plunger nose during its maximum stroke; for example, the said co-ordinates can be calculated for the positions assumed by the plunger nose for every 5° F. difference in external ambient temperature. The said positions of the roller centres may therefore be plotted in graph form. Having drawn the graph, and knowing the radius of the rollers, the cam shape can be drawn since it is a curve parallel to the locus of the roller centres and removed from the said locus by a distance equal to the roller radius.

In all the above-mentioned calculations, it is assumed that the maximum plunger travel is known, as also the areas of the ports in the casing, the areas of wall, and heat dissipating surfaces, and other necessary dimensions ascertainable from the valve mechanism and the heating system.

Having described our invention, what we claim and desire to procure by Letters Patent is:

1. A thermostatic valve comprising a casing having two opposed inlet ports and an outlet port, an oscillatory carriage housed within the casing between the said inlet ports, two spaced port closing discs on said carriage in alignment with said inlet ports, one of the said discs closing one of the said inlet ports when the carriage is at one end of its oscillatory travel and the other of the said discs closing the second of the said inlet ports when the carriage is at the opposite end of its oscillatory travel, a heat sensitive device located externally of the said casing, means connecting said device to a plunger located within the casing intermediate the said discs for displacing said plunger axially, by temperature variations externally of the casing, through distances which are directly proportional to said variations, and plunger actuated cam mechanism interposed between the plunger and the carriage for transmitting oscillating movement to the said carriage and for translating plunger movements into carriage movements which are not directly proportional to said temperature variations.

2. A thermostatic valve comprising a casing having two opposed inlet ports and an outlet port, an oscillatory carriage housed within the casing between said inlet ports, two spaced port closing discs on said carriage in alignment with a corresponding one of the said inlet ports, one of the said discs closing one of said inlet ports when the carriage is at one end of its oscillatory travel and the other of the said discs closing the second of the said inlet ports when the carriage is at the opposite end of its travel, a spring loading said carriage and tending to retain it at one end of its oscillating travel, a heat sensitive device located externally of the casing, an axially-displaceable plunger located within the casing intermediate said discs and means connected to said plunger and operable by the said device for displacing the plunger through distances directly proportional to increases in temperature externally of the casing, and plunger actuated cam mechanism interposed between the plunger and the carriage for displacing said carriage against the spring action of the said spring and for translating plunger movements into carriage movements which are not directly proportional to said temperature variations.

3. A thermostatic valve comprising a casing having two opposed inlet ports and an outlet port, an oscillatory carriage located between the said inlet ports and provided with two spaced members for closing one of the said inlet ports when the carriage is in one extreme position of its oscillatory travel and for closing the second of the said inlet ports when the carriage is in the opposite extreme position of its oscillatory travel, an axially displaceable plunger located within the casing intermediate said spaced members and actuated by a heat sensitive device located externally of the casing and adapted to displace said plunger through distances directly proportional to variations in the temperature to which the said device is submitted, and a plunger-actuated cam mechanism interposed between the said plunger and the carriage whereby the said plunger movements are transmitted to the carriage and are translated into carriage movements which are not directly proportional to the said temperature variations.

4. A thermostatic valve comprising a casing having two opposed inlet ports and an outlet port, an oscillatory carriage disposed between said inlet ports and provided on one end with a member for closing one of said inlet ports when said carriage is in one extreme position of its oscillatory travel and on its opposite end with a member for closing the second of the said inlet ports when said carriage is in the opposite extreme position of its oscillatory travel, a system of parallel levers supporting said carriage, at least one of said parallel levers being fixed to a rotatable shaft to which a bell crank lever is also fixed, an axially displaceable plunger located within the casing between said carriage ends and actuated by a heat sensitive device located externally of the casing, a spring loaded lever urged into abutment with one end of said plunger and fixed to a spindle to which a further lever is secured, said further lever being pivotally connected to one corner of a triangular link, of which a second corner is pivotally connected to one end of an arcuate link, an edge of said triangular link which extends from said second corner being located parallel to and in the plane of an adjacent edge of the said bell crank lever and the opposite end of the said arcuate link being pivotally connected to a stationary support, whereby angular movements imparted to the triangular link by endwise displacement of the plunger through distances directly proportional to variations in temperature ambient to the said heat sensitive device, are transmitted through the bell crank lever to the carriage and are translated into carriage movements which are not directly proportional to the said temperature variations.

5. A thermostatic valve comprising a casing having two opposed inlet ports and an outlet port, an oscillatory carriage disposed between said inlet ports and provided on one end with a member for closing one of the said inlet ports when said carriage is in one extreme position of its oscillatory travel and on its opposite end with a member for closing the second of said inlet ports when said carriage is in the opposite extreme position of its oscillatory travel, a system of parallel levers supporting said carriage, at least one of the said parallel levers being fixed to a rotatable shaft to which one arm of a bell crank lever is also fixed, a plate mounted on the other arm of said bell crank lever and being adjustable in a plane at right angles to the length of the said other lever arm, an axially displaceable plunger located within the casing between the said carriage ends and actuated by a heat sensitive device located externally of the casing, a spring loaded lever urged into abutment with one end of said plunger and fixed to a spindle to which a further lever is secured, said further lever being pivotally connected to one corner of a triangular link located in the plane of the adjustable plate, the edge of said link opposite to said corner being parallel to the adjacent edge of said plate, a roller carried on one end of said link edge and contacting said plate edge, and an arcuate link pivotally connected by one end to the corner of the said triangular link at the opposite end of said link edge, the opposite end of said arcuate link being pivotally connected to a support which is clamped to and is adjustable lengthwise of an arcuate stationary bracket, whereby angular movements imparted to said triangular link by endwise displacements of the plunger through distances directly proportional to variations in temperature ambient to the said heat sensitive device, are transmitted through the bell crank lever to the carriage and are translated into carriage movements which are not directly proportional to the said temperature variations.

6. A thermostatic valve comprising a casing having two opposed inlet ports and an outlet port, an oscillatory carriage located between the said inlet ports and provided spaced members for closing one of the said inlet ports when the carriage is in one extreme position of its oscillatory travel and the second of the said inlet ports when the carriage is in the opposite extreme position of its oscillatory travel, an axially displaceable plunger located within the casing between the said spaced members and actuated by a heat sensitive device located externally of the casing and adapted to displace said plunger through distances directly proportional to variations in temperature ambient to said heat sensitive device, plunger-actuated cam mechanism located within the casing for transmitting drive between the plunger and the carriage, said mechanism including a plunger-actuated triangular link pivotally connected by one corner to one end of a link of which the opposite end is pivoted upon a stationary support, and a bell-crank lever of which one arm is disposed in the plane of an edge of said triangular link whereas its other arm is fixed to a shaft linked to the said carriage, whereby displacements of the plunger by the heat sensitive device are transmitted to the carriage and translated into carriage movements which are not directly proportional to said temperature variations.

7. A thermostatic valve comprising a casing having two opposed inlet ports and an outlet port, an oscillatory carriage located between said inlet ports and provided with spaced members for closing one of the said inlet ports when the carriage is in one extreme position of its oscillatory travel and for closing the second of said inlet ports when the carriage is in the opposite extreme position of its oscillatory travel, an axially displaceable plunger located within the casing between said spaced members, a heat sensitive device located externally of the casing and coupled to the said plunger for displacing the plunger through distances directly proportional to variations in temperature ambient to the said device, a plunger-actuated cam mechanism located within the casing for transmitting drive between the plunger and the carriage, the said mechanism including a plunger-actuated triangular link pivotally connected by one corner to one end of a link of which the opposite end is pivoted to a support clamped to and adjustable lengthwise of an arcuate and stationary bracket, and a bell crank lever of which one arm is secured to a shaft coupled to the said carriage and of which the other arm carries a plate having one edge located in contact with an edge of the triangular link, the said plate being adjustable transversely of the said other arm of said bell crank lever, whereby the movements imparted to the plunger are translated into carriage movements which are not directly proportional to the said temperature variations.

8. A thermostatic valve comprising a casing having two opposed inlet ports and an outlet port, an oscillatory carriage located between the said inlet ports and provided with spaced members for closing one of said inlet ports when the carriage is in one extreme position of its oscillatory travel, for closing the second of said inlet ports when the carriage is in the opposite extreme position of its oscillatory travel, and for opening said inlet ports in proportion to the distance of the carriage from the respective inlet ports, an axially displaceable plunger located within the casing between said spaced members and actuated by a heat sensitive device located externally of the device and adapted to displace the plunger through distances directly proportional to variations in temperature ambient to the said device, and plunger-actuated cam mechanism interposed between the plunger and the carriage whereby said plunger movements are transmitted to the said carriage and are translated into carriage movements which are not directly proportional to the said temperature variations.

9. A thermostatic valve comprising a casing having two opposed inlet ports and an outlet port, an oscillatory carriage located between the said inlet ports and provided with members for closing one of the said inlet ports when the carriage is in one extreme position of its oscillatory travel and for closing the second of the said inlet ports when the carriage is in the opposite extreme position of its oscillatory travel, an axially displaceable plunger located within the casing, a heat sensitive-device located externally of the casing, means whereby said device actuates said plunger and displaces the latter through distances directly proportional to variations in temperature ambient to the said device, a spring-loaded cam urged into abutment with an end of the plunger, means operable by said cam for transmitting drive between the plunger and the carriage, the cam being shaped so as to translate said plunger movements into carriage movements which are not directly proportional to the said temperature variations.

10. A thermostatic valve comprising a casing having two opposed inlet ports and an outlet port, an oscillatory carriage located between the said inlet ports and provided with members for closing one of the inlet ports when the carriage is in one extreme position of its oscillatory travel and for closing the second of the said inlet ports when the carriage is in the opposite extreme position of its oscillatory travel, an axially displaceable plunger located within the casing, a heat sensitive device located externally of the casing, means connecting said device to said plunger and displacing the plunger through distances directly proportional to variations in temperature ambient to the said device, a spring loaded cam urged into abutment with an end of said plunger, a roller in peripheral contact with the cam, the said roller being journalled in a pivoted carrier incorporated in drive transmitting means coupled to the carriage, the roller contacting face of the said cam being shaped to translate the plunger movements into carriage movements which are not directly proportional to the said temperature variations.

11. A thermostatic valve comprising a casing having two opposed inlet ports and an outlet port, an oscillatory carriage located between the said inlet ports and provided with members for closing one of the inlet ports when the carriage is in one extreme position of its oscillatory travel and for closing the second of the said inlet ports when the carriage is in the opposite extreme position of its oscillatory travel, an axially displaceable plunger located within the casing, a heat sensitive device located externally of the casing, means connecting said device to said plunger and displacing the plunger through distances directly proportional to variations in temperature ambient to the said device, a spring loaded cam urged into abutment with an end of said plunger, two rollers located one on each of opposed sides of the cam and making peripheral contact with said sides, each roller being journalled in a U-shaped bridge arranged transversely to the direction of plunger and cam travel, a tension spring connected to and between the bridges, each bridge being journalled by its opposite ends about a stationary support, at least one corresponding lever associated with each bridge, each of said levers being pivoted about a fulcrum of the corresponding bridge and being pivotally connected to the said carriage, and one leved being fixed relatively to the corresponding bridge, the roller contacted sides of the cam being shaped so as to translate plunger movements into carriage movements which are not directly proportional to the said temperature variations.

References Cited in the file of this patent

UNITED STATES PATENTS

| | | |
|---|---|---|
| 1,224,614 | Dougan | May 1, 1917 |
| 2,172,828 | Berks | Sept. 12, 1939 |
| 2,355,043 | Adlam | Aug. 8, 1944 |
| 2,359,448 | Shaw | Oct. 3, 1944 |
| 2,404,596 | Roche | July 23, 1946 |
| 2,404,597 | McClain | July 23, 1946 |
| 2,448,170 | Brown | Aug. 31, 1948 |